Aug. 19, 1958     K. G. CHURCHILL     2,848,007
PORTABLE CAMPING SHELTER
Filed Nov. 23, 1956     4 Sheets-Sheet 1
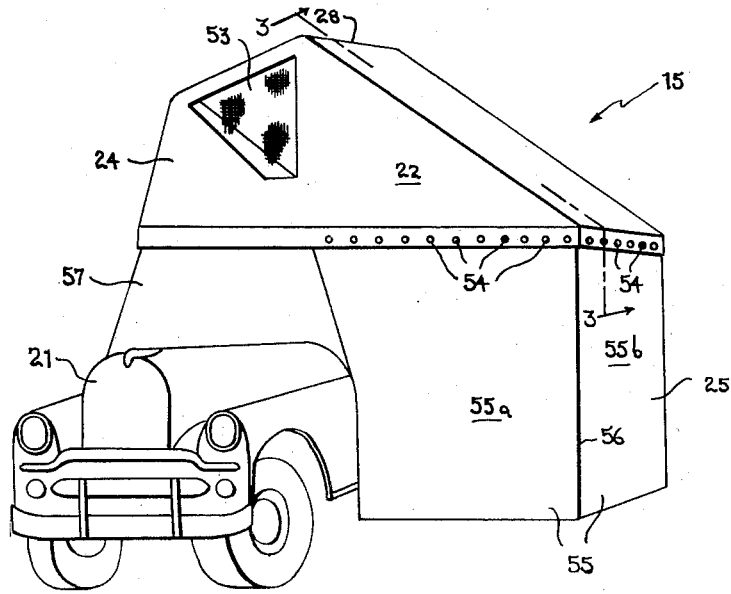
Fig-1-
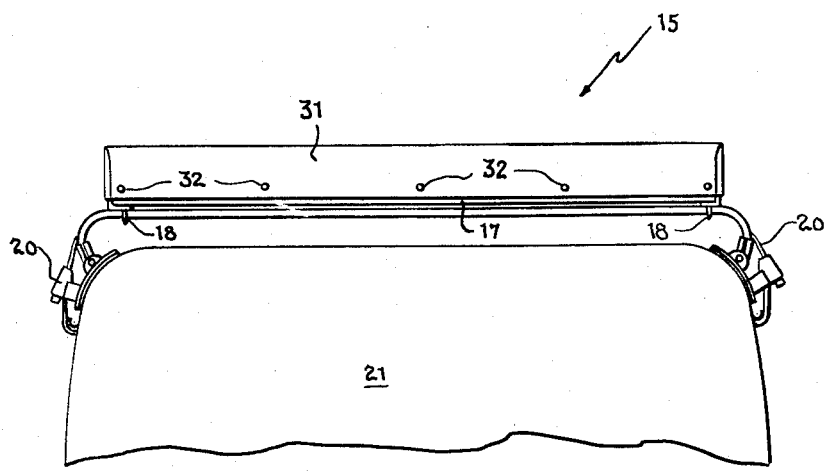
Fig-2-
INVENTOR.
Kenneth G. Churchill,
BY
    ATTORNEY.

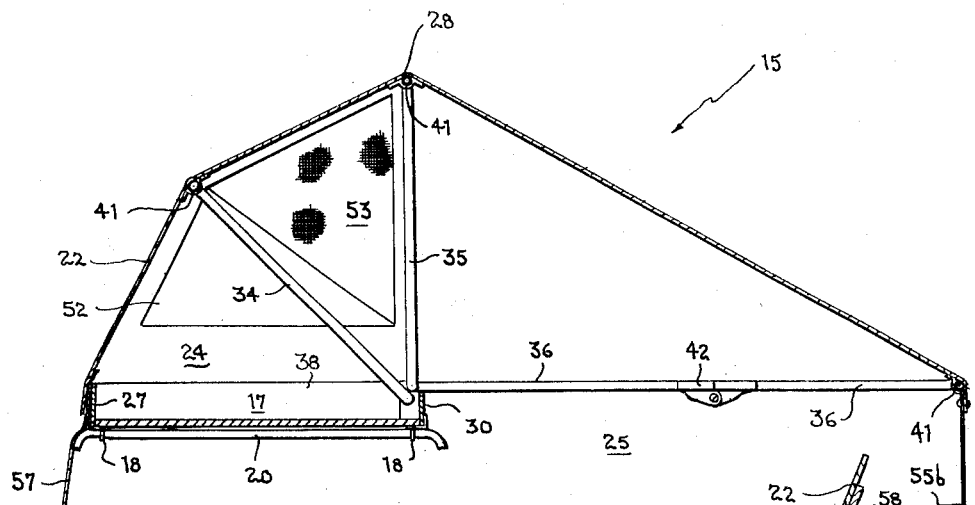
Fig-3-
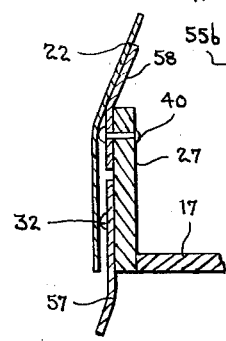
Fig-11-
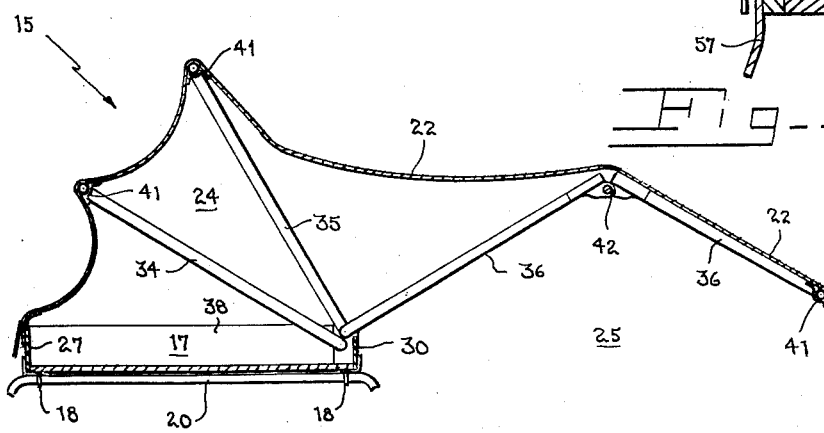
Fig-4-
INVENTOR.
Kenneth G. Churchill.
BY
Richard von K. Bruns
ATTORNEY.

Aug. 19, 1958 K. G. CHURCHILL 2,848,007
PORTABLE CAMPING SHELTER
Filed Nov. 23, 1956 4 Sheets-Sheet 3
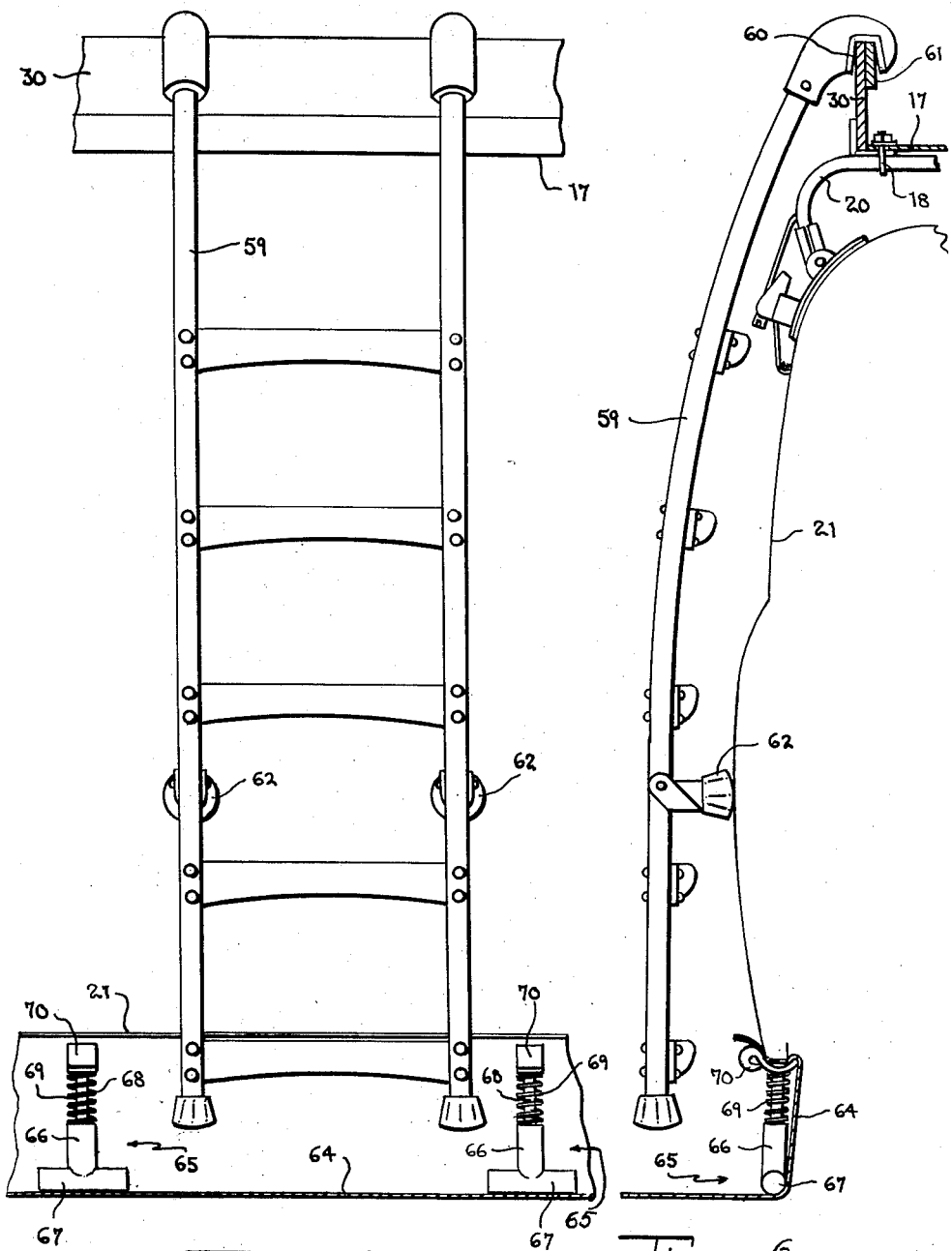
Fig-5-  Fig-6-
INVENTOR.
Kenneth G. Churchill.
BY
Richard von K. Bruns
ATTORNEY.

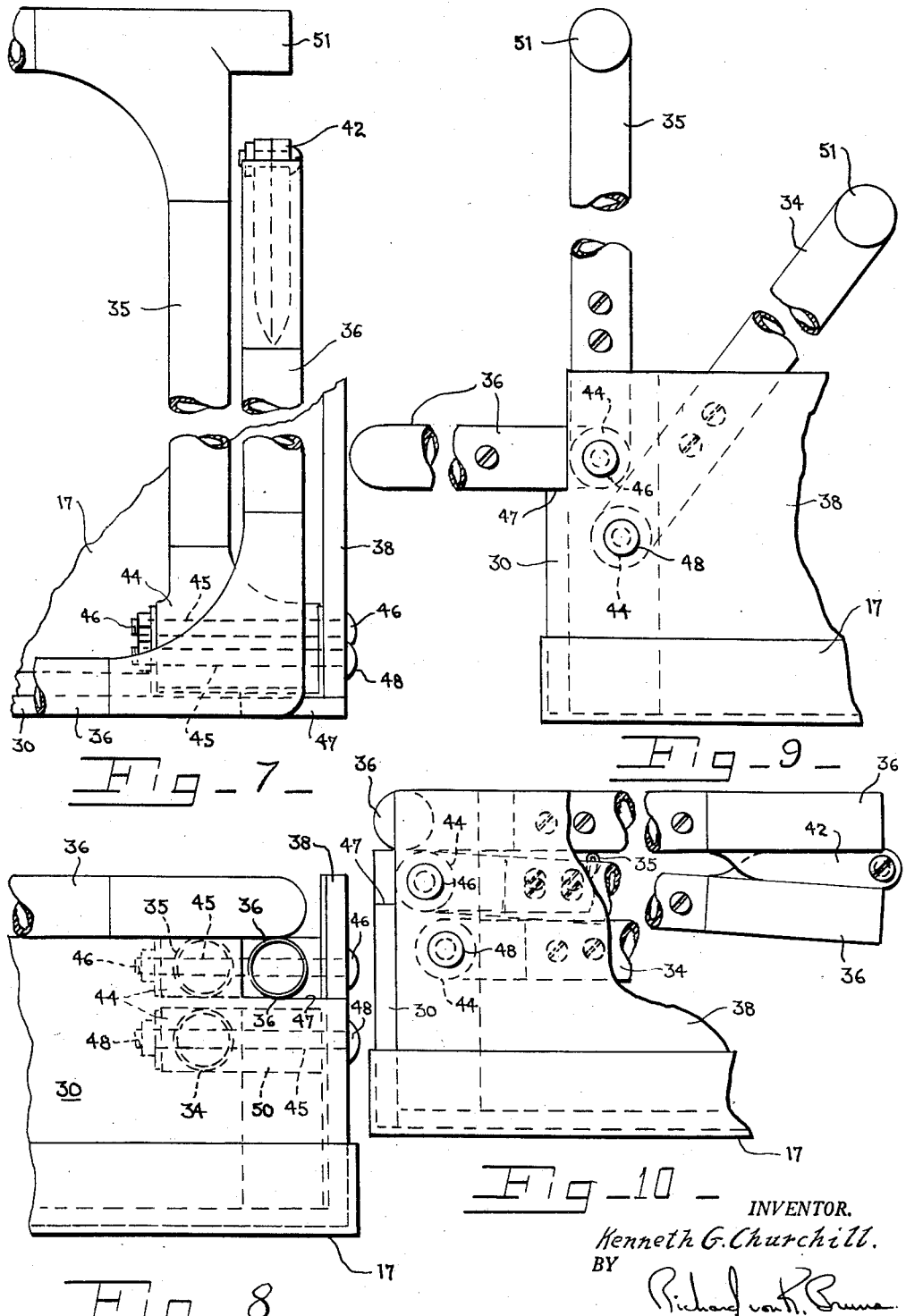

United States Patent Office 2,848,007
Patented Aug. 19, 1958

2,848,007

PORTABLE CAMPING SHELTER

Kenneth G. Churchill, East Syracuse, N. Y.

Application November 23, 1956, Serial No. 623,917

2 Claims. (Cl. 135—4)

This application is a continuation-in-part of now abandoned application Serial No. 541,607, filed October 20, 1955, by the applicant. The invention disclosed herein relates generally to camping equipment, and has particular reference to a novel portable camping shelter which is adapted to be transported and used upon the top of an automobile.

The applicant is aware of the fact that various types of automobile supported camping shelters and "car top beds" have been developed heretofore. Apparently, however, these prior developments have not met with very widespread acceptance among tourists and campers, and one of the chief reasons for this lack of acceptance seems to be that it is frequently a rather laborious and time consuming job to set up the devices so that they can be used. Most of the shelters, of course, are transported by the automobile in a collapsed state and if the weather is rainy or cold when it is time to use the shelter, the job of setting it up can be quite unpleasant particularly when it is a slow and complicated procedure. Many of the prior devices, moreover, involve complex structures that are relatively expensive to manufacture and thus must be marketed at a cost which may be beyond the means of the average user.

In order to eliminate the principal disadvantages of the previously developed structures of the above mentioned type, the present invention contemplates and has as its primary object the provision of an automobile supported camping shelter which may be quickly and easily readied for use and, at the same time, is of relatively simple and inexpensive construction. To this end, the shelter of the invention is constructed and arranged so that it can be erected from its collapsed state in a single, rapid operation to provide both a sheltered sleeping compartment above the automobile and a connecting sheltered picnic or "living" area adjacent one side thereof. Any additional steps that may be taken to further enclose the living area of the shelter may then be performed under cover as will be described in detail hereinafter.

Another important object of the invention is to provide a portable camping shelter for use with an automobile which is adapted to form a relatively large enclosed area above and adjacent the automobile and yet may be folded into a compact, lightweight package when not in use.

Still another important object of the invention is to provide a portable camping shelter for transportation and use upon the top of an automobile, which shelter when erected is substantially water-tight and windproof.

A further important object of the invention is to provide a portable camping shelter for use with an automobile, which shelter is exceedingly strong and durable.

A still further important object of the invention is to provide a portable camping shelter for use with an automobile, which shelter requires no special tools or equipment to set up or collapse.

A more specific object of the invention is to provide a portable camping shelter for use with an automobile, which shelter includes a unitary covering member that can be moved into fully extended sheltering position by simply pulling outwardly upon a single operating member of the structure.

Other objects and advantages of the invention will become apparent from the following detailed description thereof read in conjunction with the accompanying drawings which illustrate a representative embodiment of the portable camping shelter for the purpose of disclosure.

In the drawings:

Figure 1 is a perspective view of a portable camping shelter embodying the invention mounted upon an automobile, the shelter being shown in fully extended position;

Figure 2 is a front end elevation of the upper portion of the automobile with the shelter being shown in collapsed carrying position;

Figure 3 is a vertical section through the shelter in extended position, the section being taken substantially along line 3—3 of Figure 1;

Figure 4 is a view corresponding to Figure 3 showing the shelter in a partially collapsed position;

Figure 5 is an enlarged side elevation showing the ladder means for the sleeping compartment portion of the shelter, and also showing the coacting means for securing the ground cloth in sealed relation to the side of the automobile;

Figure 6 is an end elevation, partly in section, corresponding to Figure 5;

Figure 7 is an enlarged top plan view of one corner of the shelter base member showing the details of the bow member mounting means;

Figure 8 is a side elevation corresponding to Figure 7;

Figure 9 is an end elevation corresponding to Figure 7 with the bows shown in elevated position;

Figure 10 is a view corresponding to Figure 9 showing the bows in collapsed position; and Figure 11 is an enlarged vertical section corresponding to a portion of Figure 3 and showing a detail of the cover member construction.

Having reference now to the drawings, wherein like reference numbers designate the same parts in each of the views, 15 generally indicates the portable camping shelter which is shown in extended position in Figure 1 and collapsed position in Figure 2. The shelter includes a base member which is preferably in the form of a shallow rectangular box 17, the box being secured as by U-bolts 18 to a conventional luggage rack 20 mounted on the top of an automobile 21. Box 17 is sufficiently large so that two people can sleep comfortably therein and may be equipped with an air mattress and other suitable bedding for this purpose.

Coacting with the mattress box is a collapsible top assembly including a cover member 22 of flexible sheet material such as waterproof canvas, a canvas available commercially under the name Vivatex having been found to be particularly well suited in actual embodiments of the invention. In its fully extended or erected position, the top assembly forms with the box an enclosed sleeping compartment 24 and also a covered "living" area 25 adjacent the side of the vehicle, the term "living" area as used herein being intended to mean a sheltered area for cooking, eating, dressing, and the like. To this end, the cover 22, which is a unitary member, is arranged to extend upwardly from one side 27 of the box 17 to a peak 28 substantially above the opposite side 30 of the box, and from the peak downwardly and outwardly to a point spaced a considerable distance from the side 30 and side of the vehicle to form the covered living area 25, the latter thus being in communication with the enclosed sleeping compartment 24 as indicated in Figures 1 and 3.

When the top assembly is collapsed from its fully extended position just described, it fits substantially within the shallow box 17 to form a compact carrying package as shown in Figure 2, a dust cover 31 preferably being positioned over the top of the folded assembly and box to prevent road dust from entering therein. This package is relatively flat and thus affords a minimum of wind resistance when the vehicle is moving. The dust cover 31 extends down over the sides and ends of the box and is detachably secured thereto as by glove snaps 32, the cover being quickly removable by simply running a finger along between the edge thereof and sides of the box to release the snaps.

As best shown in Figures 3 and 4, the cover member 22 is supported in its fully extended or erected position by means of a plurality of bow members, three such members 34, 35 and 36 being shown in the illustrated embodiment of the invention. These bow members are substantially U-shaped and each comprises a back portion and a pair of leg portions secured to opposite ends of the back portion. The free ends of the bow member leg portions are pivotally secured to the ends 38 of the mattress box adjacent the side 30 thereof in a manner to be described in detail hereinafter.

The cover member 22 is secured to the side 27 of the box (the back side when the shelter is erected) and to the ends 38 thereof as by rivets 40, see Figure 11. The back portions of the bow members 34, 35 and 36 extend through pockets 41 formed in the cover so that pivotal movement of the bows will position the cover in the desired extended position, or conversely, extension of the cover will move the bows to their desired supporting positions. In such positions, the bow member 34 projects upwardly at an oblique angle from its pivot point, the member 35 projects substantially vertically and the member 36 projects substantially horizontally, as shown in Figure 3.

The height of bow members 34, 35 is slightly less than the width of the mattress box 17 so that these members fit within the box when the top assembly is collapsed. The bow member 36, on the other hand, has a length that is nearly twice the height of the other members so that this member can extend the cover 22 outwardly from the box a sufficient distance to provide a good sized shelter for the living area 25 adjacent the side of the vehicle. Accordingly, in order to enable the bow member 36 to also fit within the box when the top assembly is collapsed, the leg portions of the member are provided with hinged joints 42 at the approximate mid-points thereof so that the member can be folded back upon itself or doubled over into approximately the same size as bow members 34, 35.

The hinged joints 42 permit the leg portions of bow member 36 to be folded in only one way, the joints "breaking" upon upward movement of the leg portion mid-points as shown in Figure 4, but preventing movement in the opposite direction. This positions the back portion of the member 36 adjacent the front side 30 of the box so that it overlies the pivotal connections of the bow members when the top assembly is fully collapsed, Figures 7, 8 and 10, the back portions of the other bow members being positioned adjacent the back side 27 of the box. With this arrangement, the top assembly can be quickly and easily erected by simply grasping the top portion of the bow member 36 lying adjacent the front of the box and pulling it outwardly in a substantially horizontal direction since this moves the member into its unfolded position and at the same time causes the cover 22 and remaining bow members 34, 35 to be moved into position.

Referring to Figures 7–10, it will be seen that the free ends of the bow members are fitted with cast plugs 44 having horizontal bores 45 therethrough. The plugs for bow members 35 and 36 are mounted on a common bolt 46 which passes with a free fit through the bores 45, the member 35 being positioned inwardly of the member 36. With this arrangement, the back portion of member 36 will overlie these plugs when the member is folded into the box. The front side 30 of the box is provided with notches 47 in alignment with the leg portions of bow member 36 to accommodate the leg portions when the member is moved into its outwardly extending position.

The plugs 44 for the bow member 34 are mounted in a similar manner on a bolt 48 positioned below the bolt 46 and slightly to the rear thereof. Bow members 34, 35 are of substantially the same width, and the plugs for the member 34 are elongated as indicated at 50, Figure 8, so that the member is aligned beneath the member 35. Since bow member 36 is positioned outwardly of members 34 and 35, and is therefore slightly wider than these members, the back portions of members 34 and 35 are provided with T connections 51 adjacent each end thereof so that the back portions of all of the members where they engage the cover member 22 are of substantially equal width. The foregoing arrangement enables all of the bow members to be pivotally secured adjacent one side of the box 17 and at the same time permits them to be folded compactly therein as indicated.

The portion of the cover member 22 forming the sleeping compartment may be formed at its ends with a pair of flaps 52 which may be provided with zipper fasteners on two sides thereof so that the flaps can be opened for ventilation. The openings thus formed are covered with suitable mosquito netting 53 secured to the edges of the openings on the exterior sides thereof. The outwardly extending portion of the cover member supported by the bow member 36 is provided adjacent its lower peripheral edge with a plurality of glove snaps 54, Figure 1, and one or more depending curtains 55 may be detachably secured to the cover by means of the snaps to enclose the sheltered living area 25. Preferably the depending curtain 55 is made in two parts 55a, 55b so that an entry-way 56 is provided therebetween.

An additional depending curtain 57 of shorter length than the curtain 55 may also be detachably secured to box 17 for the purpose of covering the windshield, opposite side windows and back window of the automobile. The curtain 57 is adapted to be held in position by the glove snaps 32 provided for the dust cover which, of course, is removed when the shelter is erected. To prevent rain or drafts from entering at the top of curtain 57, the bottom of the cover member 22 extends downwardly thereover as best shown in Figure 11, the cover being provided with an inside flap 58 which is attached to the box 17 to secure the cover thereto.

Having reference to Figures 5 and 6, a ladder 59 of the boat ladder type is shown, this ladder permitting access from the ground level into the sleeping compartment 24. The ladder 59 is supported at its upper end on the box 17 by means of a groove 60 in the top of the ladder which engages the front side 30 of the box, the latter being provided with a reinforcing member 61 for this purpose. This ladder may be provided adjacent the lower portion thereof with bumper members 62 to space the ladder from the car body and prevent scratching or marring of same.

The portable camping shelter is preferably provided with a ground cloth member 64 for the purpose of covering the floor of the area enclosed by curtains 55a, 55b. This ground cloth may be secured to the bottom of these curtains as by glove snaps or staking (not shown) to prevent drafts from entering at the bottom of the shelter. In order to prevent drafts from passing beneath the vehicle and entering the shelter, the ground cover may be folded upwardly adjacent the side of the vehicle and releasably held in engagement with the lower edge thereof by means of a plurality of spring biased jacks 65. These jacks comprise a hollow sleeve 66 secured to a base member 67, and a T-shaped member 68 having a shank slidably mounted in the sleeve and biased upwardly by means of a compression spring 69 positioned between the sleeve and top 70 of the T-member. As shown in Figures 5 and 6, the tops 70 of the jacks resiliently hold the upper edge of the ground cloth in engagement with the vehicle.

The operations of setting up the shelter for use and collapsing it for carrying may be briefly summarized as follows: The dust cover 31 is removed and the back portion of the bow member 36 is then pulled outwardly to erect the cover member 22 and remaining bows. These steps can be accomplished in two or three minutes, and almost immediate shelter is provided. The weight of the bow member 36 holds the cover in its extended position, although guy lines from the back portion of the bow to the vehicle may be desirable if the wind is high. However, the weight of the side curtains 55 further serves to anchor the cover and, as noted above, the outwardly extending portion of the cover provides shelter against rain or the like while these curtains are being attached and the ground cover arranged. To collapse the shelter, the above steps are simply reversed, the bow member being folded as shown in Figure 4 and pushed towards the box whereupon the weight of the cover and bows causes them to settle into the box without further effort being expended by the user.

From the foregoing description, it will be apparent that the invention disclosed herein provides a novel and highly practical camping shelter of the type adapted to be transported upon and used with an automobile. The construction of the shelter is relatively simple, the mattress box 17, unitary cover member 22 and bow members 34, 35 and 36 being the essential parts thereof. The arrangement of these parts, however, enables the shelter to be erected or collapsed with maximum speed and minimum effort, and the enclosed area defined thereby is both spacious and conveniently arranged.

The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. In a portable camping shelter adapted to be supported on the top of a vehicle, a base member in the form of a shallow rectangular box, a plurality of bow members pivotally secured at their free ends to said box and normally contained therein with the legs thereof disposed transversely of the box, the legs of one of said bow members being considerably longer than the width of the box and being formed in two approximately equal length sections having hinged joints therebetween to permit the member to fit within the box by being folded back upon itself, and a cover of flexible sheet material secured to said bow members and adapted to be elevated to a position above said box and extending outwardly beyond one side thereof a distance equal to approximately twice the width of the box when the bow members are pivotally moved to project from the box, said sectional bow member being unfolded during such movement so that it projects outwardly from the box in a substantially horizontal position and forms the sole support for the outwardly extending portion of said cover, the hinged joints of said member holding the hinged sections thereof in end to end abutment in such position to provide the maximum possible outward extension of said cover for the length of sections used.

2. In a portable camping shelter adapted to be transported by and used with an automotive vehicle having a rack mounted on the top thereof, a shallow rectangular box adapted to be secured to said rack and contain bedding material therein, a collapsible top assembly forming with said box and vehicle an enclosed sleeping compartment and adjacent covered living area respectively, said top assembly including a cover member of flexible sheet material secured to said box and extending upwardly from one side thereof to a peak located substantially above the opposite side thereof and downwardly from said peak to a point spaced outwardly from said opposite side and from the side of the vehicle, a plurality of bow members to support said cover member in said extended position, said bow members being pivotally secured at their free ends to said box, one of said bow members being longer than the other bow members and extending outwardly from said box in a substantially horizontal position to support the outwardly extending portion of said cover member, the remainder of said bow members supporting the upwardly extending portion of the cover member above the box, said longer bow member having legs each of which is formed of a plurality of sections with hinged joints therebetween, said hinged joints having offset pivot points and operating as stops to hold the hinged sections of said member in end to end abutment in its horizontally extending position to provide the maximum possible outward extension of said cover member for the length of sections used.

References Cited in the file of this patent

UNITED STATES PATENTS

| 2,222,636 | Strauss | Nov. 26, 1940 |
| 2,513,411 | Heil | July 4, 1950 |

FOREIGN PATENTS

| 513,613 | Canada | June 14, 1955 |

OTHER REFERENCES

Popular Science Magazine, June 1955, page 167.